Figure 4:
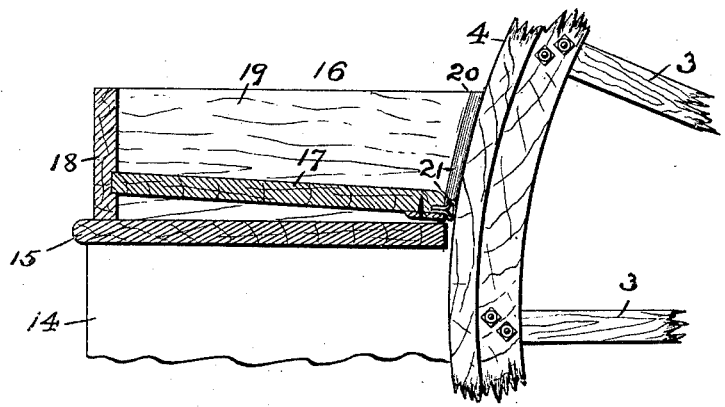

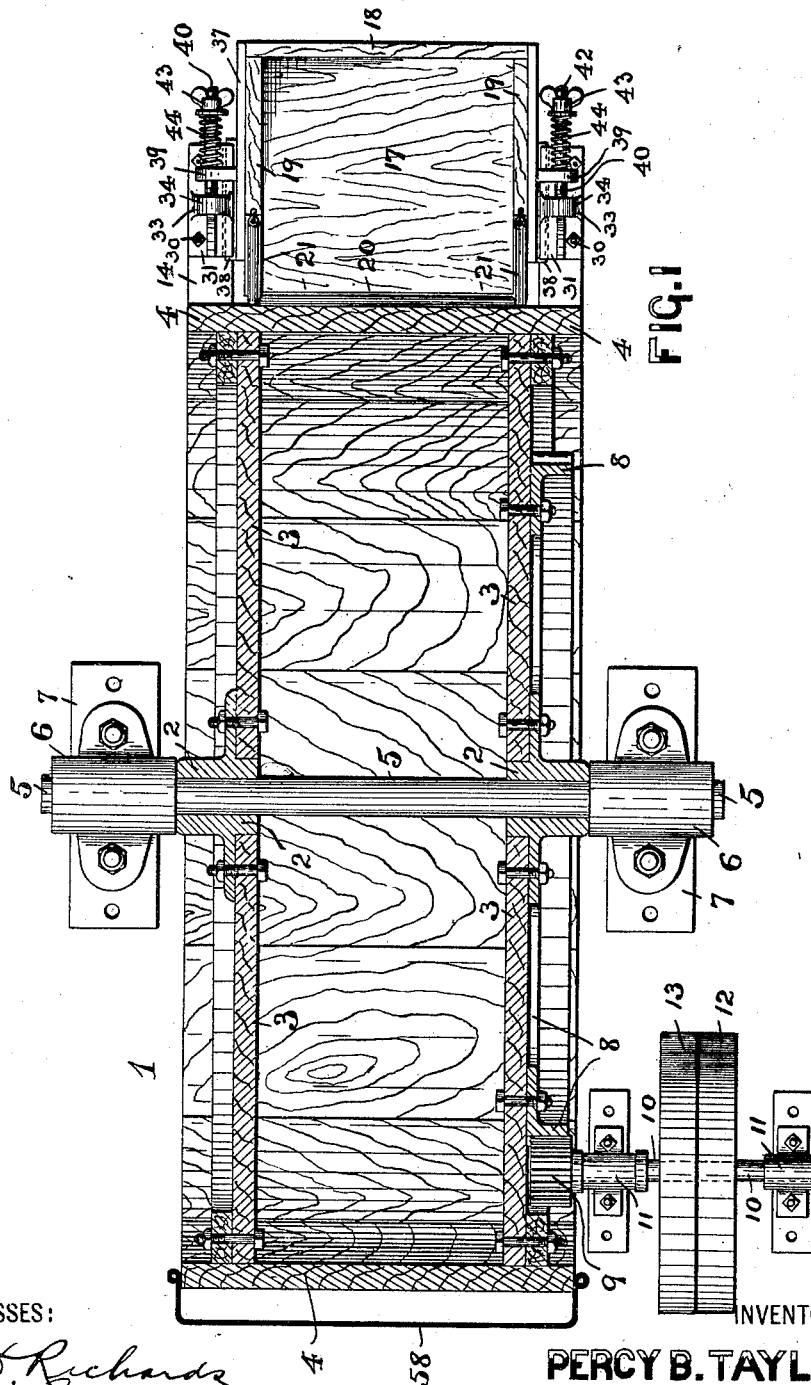

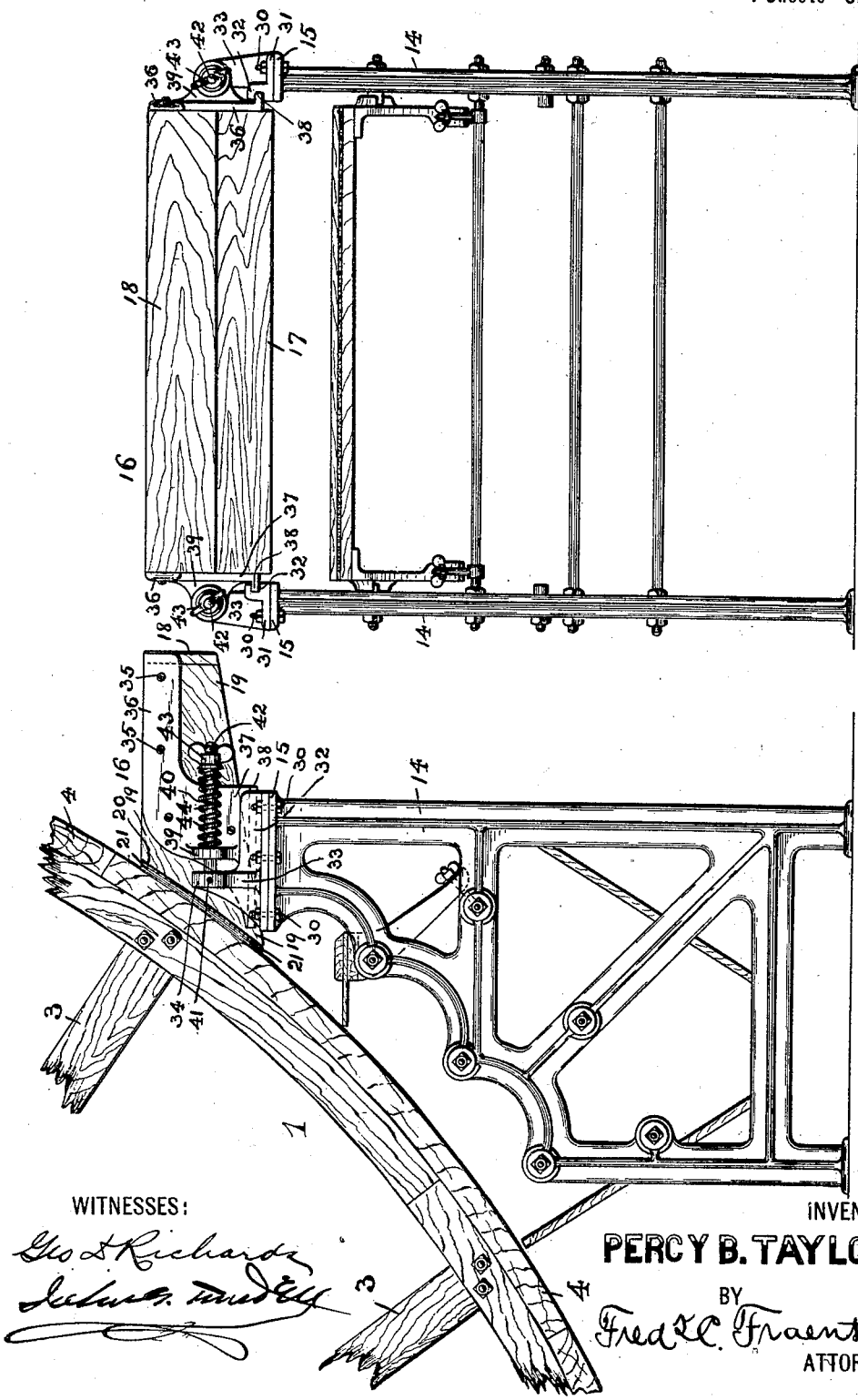

No. 704,592. Patented July 15, 1902.
P. B. TAYLOR.
COATING TRAY.
(Application filed Jan. 30, 1901.)
(No Model.) 4 Sheets—Sheet 3.

WITNESSES:
Geo. H. Richards
John G. Tindell

INVENTOR:
PERCY B. TAYLOR
BY
Fred'k C. Fraentzel,
ATTORNEY

THE NORRIS PETERS CO., PHOTO-LITHO., WASHINGTON, D. C.

No. 704,592.　　　　　　　　　　　　　　　　Patented July 15, 1902.
P. B. TAYLOR.
COATING TRAY.
(Application filed Jan. 30, 1901.)

(No Model.)　　　　　　　　　　　　　　　　4 Sheets—Sheet 4.

WITNESSES:

INVENTOR:
PERCY B. TAYLOR
BY
ATTORNEY

UNITED STATES PATENT OFFICE.

PERCY B. TAYLOR, OF NEWARK, NEW JERSEY, ASSIGNOR TO THE PURE FOOD COMPANY, A CORPORATION OF NEW JERSEY.

COATING-TRAY.

SPECIFICATION forming part of Letters Patent No. 704,592, dated July 15, 1902.

Original application filed November 8, 1899, Serial No. 736,244. Divided and this application filed January 30, 1901. Serial No. 45,302. (No model.)

*To all whom it may concern:*

Be it known that I, PERCY B. TAYLOR, a citizen of the United States, residing at Newark, in the county of Essex and State of New Jersey, have invented certain new and useful Improvements in Coating-Trays for Apparatus for the Desiccation of Eggs; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My present invention, which is a division of my former application for a patent filed November 8, 1899, Serial No. 736,244, relates generally to improvements in apparatus for the desiccation of eggs or other material; and the invention has reference more particularly to a novel construction and arrangement with a rotating drum or wheel and a coating-tray in which the egg-batter or other material for desiccation is contained for application in the viscid or glutinous state to the drying-surface of the drum or wheel or other equivalent device in an approximately even and unbroken film or sheet.

The primary object of this invention, therefore, is to improve the general arrangement and construction of revolving drum or wheel and feeding-tray for the desiccation of eggs or other materials and, furthermore, to provide a novel means for delivery of the viscid or glutinous material for the purpose of manufacture in an even and unbroken sheet from the coating-tray in a manner easily controlled and regulated without the least possible waste of the material and with but very little cost of machinery or apparatus.

This invention therefore consists in the novel construction of coating-tray to be hereinafter fully described; and, furthermore, this invention consists in the several novel arrangements and combinations of parts, as well as in the details of the construction of such parts, all of which will be more particularly set forth in the accompanying specification and then finally embodied in the clauses of the claim, which form a part of this specification.

The invention is clearly illustrated in the accompanying drawings, in which—

Figure 5:
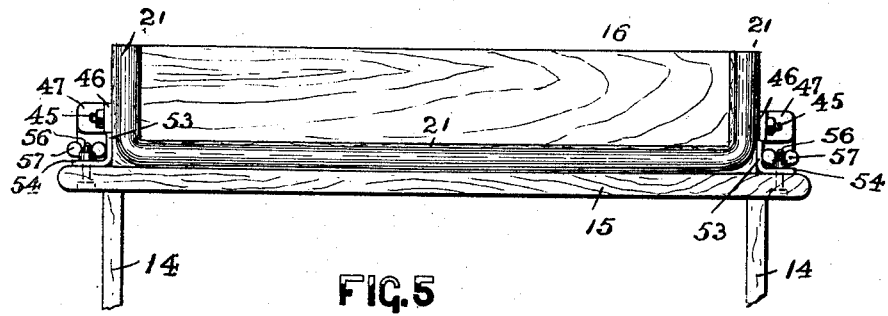
Figure 6:
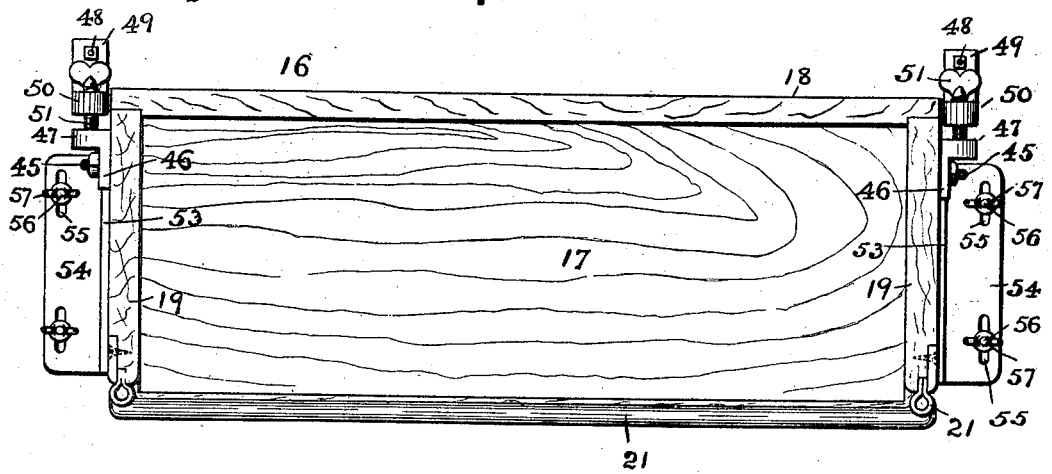
Figure 7:
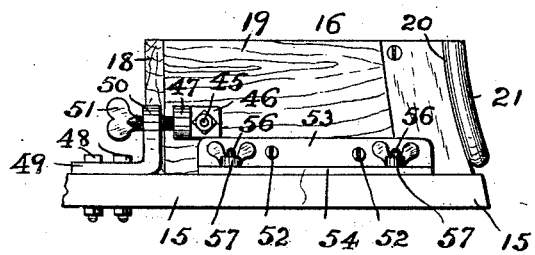
Figure 8:
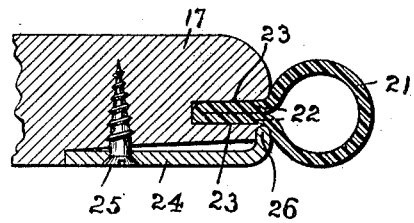
Figure 9:
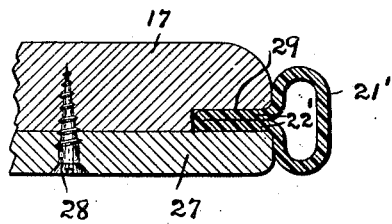
Figure 10:
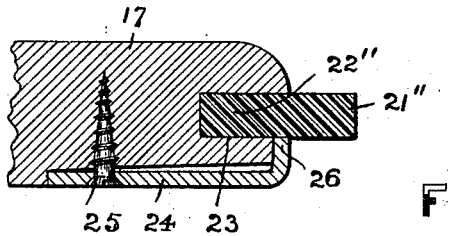

Figure 1 is a horizontal section of a drying drum or wheel, illustrating in connection therewith one means for driving the same and the application to its drying-surface of a coating-tray made according to the principles of my present invention. Fig. 2 is a side elevation of a portion of the rim of the drying drum or wheel and a supporting-frame with the coating-tray in its operative position against the surface of the said drum or wheel, and Fig. 3 is a front view of the said frame and tray. Fig. 4 is a vertical section of another form of coating-tray made according to the principles of this invention, the same being represented in its operative contact with a portion of the surface of the drum or wheel. Fig. 5 is a front view of the said coating-tray with a portion of a supporting-frame on which said tray is placed; and Fig. 6 is a top or plan view of the said tray, on an enlarged scale, said view illustrating in connection with the said tray a different means of adjustment. Fig. 7 is a side view of the said tray and the means of adjustment connected therewith. Figs. 8, 9, and 10 are diagrammatical representations of portions of the tray and differently-formed contact-strips, which are forced against the surface of the drum or wheel and prevent the escape of the viscid or glutinous material within the tray from its side and bottom edges when in operation against the face of the said drum or wheel.

Similar characters of reference are employed in all of the said above-described views to indicate corresponding parts.

In the said drawings, 1 indicates any suitably-constructed drum or wheel comprising the hub 2 and spokes or arms 3, to which is secured in any desirable manner a suitable cylindrical body 4, which forms a drying-surface and onto which the material to be desiccated is to be applied in the manner hereinafter fully set forth. The said wheel is preferably made of wood; but any other suitable material may be employed, and it may be differently constructed. The said drum or wheel is supported upon a shaft 5, which rotates in bearings 6 of suitable supports or pedestals 7, as will be clearly understood. Any suitable driving means may be employed for causing the rotation of the said drum or wheel 1, the preferred mechanism being a toothed ring 8, which is arranged against one side of the said drum or wheel, substantially in the manner represented in Fig. 1 of the drawings, and a pinion 9, geared with the same, said pinion 9 being arranged and secured upon a shaft 10, which rotates in bearings 11. Upon this shaft 10 is secured a loose pulley 12 and a fast pulley 13 for actuating the shaft from a belt in the usual manner. Suitably placed at one side of the cylindrical body 4 of the said drum or wheel 1, as will be noticed more particularly from an inspection of Figs. 1 and 2 of the drawings, is a supporting-frame of any usual construction, which consists, essentially, of the two side frames or standards 14 and a top 15 for the placing thereon of a coating-tray 16. The said tray consists, essentially, of an inclined bottom 17, a back 18, and the sides 19, being left open at the top and front and the forward edges 20 of said tray being made tapering, substantially as shown, so as to conform to the cylindrical surface of the drum or wheel 1. The said coating-tray is adjustable toward or from the face of the cylindrical body 4 of the drum or wheel 1 for the compression of rubber or other flexible contact-strips 21 against the said body 4 of the drum or wheel 1 to prevent any loss of the egg-batter or other material at the sides and bottom edges of the tray 16.

In Figs. 8, 9, and 10 of the drawings I have illustrated various forms of flexible contact-strips which may be employed in connection with the tray, the forms represented in Figs. 8 and 9 being the preferred forms of strips. The strip 21 (indicated in said Fig. 8) is tubular in cross-section and has its portions 22 doubled upon themselves and arranged in a groove 23, formed in the edges of the bottom 17 and in the edges of the sides 19 of the tray, substantially as illustrated, being securely held in position against displacement when the strip is in sliding contact with the revolving surface of the drum or wheel 1 by a suitable plate or bar 24, which is secured in position by means of screws 25 or otherwise and has the holding edge 26, which firmly bites or grips the portions 22 of the strip 21 to prevent any possibility of such displacement. In the said Fig. 9 I have illustrated a flexible strip 21' of a slightly-different form in cross-section and a different means of securing this strip in position. In this construction the strip 21' has its portions 22' firmly wedged in a recess or a cut-away portion 29 in the bottom and sides of the tray, the said parts being securely held in place by means of a plate or piece 27 and the screws 28, as illustrated. The said flexible rubber strips 21 and 21', as will be clearly evident, may, if desired, be filled with air, so as to provide a pneumatic rubber edge or binding at the side and bottom edges of the tray. In some instances I may secure in the recess 23 a solid and flexible strip 21'', which has its portions 22'' arranged in the recess 23 and is held in place by the clamping or holding end 26 of the plate or bar 24. Of course it will be evident that any other suitable forms of flexible strips may be employed with the said tray 16, and the said strips may be secured in position by any other means.

In Figs. 1, 2, and 3 of the drawings I have illustrated one form of adjusting mechanism to be employed in connection with the tray 16 for automatically forcing the contact-strips on the bottom and side edges of the tray in close contact with the cylindrical portion 4 of the drum or wheel 1 and causing the coating-tray to adjust itself to any inequalities in the cylindrical body 4 during the rotation of the drum or wheel. As shown in the said figures, I have secured in position upon the top 15 of each standard or frame 14 by means of suitable bolts 30 or in any other suitable manner a plate 31. Each plate 31 is provided with the upwardly-extending guide portion or way 32, and each plate 31 is also provided with an upwardly-extending post 33, having an eye or perforated boss 34. Suitably secured upon each side 19 of the coating-tray 16 by means of screws 35 or in any other manner is a plate 36, provided with the downwardly-extending part 37 and a rib 38, fitted and slidably arranged in the way or guide 32, substantially as illustrated. The said downwardly-extending part 37 of each plate 36 is also provided with a perforated ear or lug 39, extending at a right angle, or approximately so, from the said part 37, in which is loosely arranged a rod or bolt 40. This rod has its one end secured within the eye or perforated boss 34 either by means of a pin 41 or in any other manner and has upon its opposite and screw-threaded end 42 an adjusting-nut 43. Encircling each rod or bolt 40 on that portion between the adjusting-nut 43 and the perforated ear or lug 39 of the side piece 36, secured to the tray, is a coiled spring 44, the coils of which will constantly cause the flexible strips which are secured in the edges of the tray, as hereinabove set forth, to be in positive contact with the cylindrical part 4 of the rotating drum or wheel 1, and thereby prevent any loss of the egg-batter or other material at the sides and bottom of the tray 16, as will be clearly evident.

In Figs. 5, 6, and 7 I have illustrated another means for adjusting the tray to or from the face of the cylindrical body 4 of the drum or wheel 1. In this construction I have secured to the outer face of each side 19 of the tray 16 by means of a bolt or screw 45 or in any other suitable manner brackets or plates 46, each plate having a shoulder 47 extending at a right angle, or approximately so, from the body of each plate 46, and firmly secured upon the top 15 of the side frames or standards 14 by means of bolts or screws 48 are a pair of brackets or plates 49, on each of which is an upwardly-extending arm or lug 50, having a screw-threaded hole for the reception of a suitable adjusting screw or bolt 51, which can be screwed against the shoulder or plate 47 of the respective plate 46 at each side of the coating-tray. Suitably secured against the outer faces of the two sides 19 of the tray 16 by means of screws 52 or in any other suitable manner are guide-plates 53. Each guide-plate 53 has a shoulder 54 formed at a right angle thereto, or approximately so, said shoulders being provided with slots 55 or the equivalent thereof, whereby said plates 53 can be slidably arranged over certain studs or pins 56 in the top 15, and the coating-tray can thereby be held in its adjusted position against the rotating surface of the drum or wheel 1 by means of suitable thumb-pieces 57 on the upper screw-threaded ends of the said studs or pins 56. It will thus be clearly evident that by slightly unscrewing the said thumb-nuts and by turning the adjusting screws or bolts 51 the tray 16 can be readily forced in a forward direction toward the body of the drum or wheel to compress the contact-strips at the bottom and side edges of the tray and cause the free edges of the bottom and sides of the tray to close up against the moving surface of said body 4 of the revolving drum or wheel 1, and thereby provide a batter-receiving receptacle from which the batter or other material is readily applied in a thin and even coating upon the surface of the said drum or wheel, upon which the material is then thoroughly dried by the extraction of all moisture when a current of dry and heated air is forced around the part 4 of the drum or wheel through a surrounding air-box 58. (Indicated in Fig. 1 of the drawings.)

Of course I am aware that changes may be made in the various arrangements and combinations of the several parts herein set forth, as well as in the details of the construction of the same, without departing from the scope of my invention. Hence I do not limit my invention to the exact arrangements and combinations of the various parts as herein described and as illustrated in the accompanying drawings, nor do I confine myself to the exact details of the construction of such parts.

Having thus described my invention, what I claim is—

1. In an apparatus for the desiccation of eggs, or other material, the combination, with a drying-drum and means for actuating the same, of a coating-tray, consisting, essentially, of a bottom and three inclosing sides, and open toward the drying-surface of said drum, and flexible contact-strips connected with the open edges of said tray for making a close contact between the tray and the drying-surface of said drum, substantially as and for the purposes set forth.

2. In an apparatus for the desiccation of eggs, or other material, the combination, with a drying-drum, means for actuating the same, and a support, of a coating-tray adjustably arranged on said support, consisting, essentially, of a bottom and three inclosing sides, and open toward the drying-surface of said drum, and flexible contact-strips connected with the open edges of said tray for making a close contact between the tray and the drying-surface of said drum, substantially as and for the purposes set forth.

3. In an apparatus for the desiccation of eggs, or other material, the combination, with a drying-drum, means for actuating the same, and a support, of a coating-tray arranged on said support, consisting, essentially, of a bottom and three inclosing sides, and open toward the drying-surface of said drum, flexible contact-strips connected with the open edges of said tray, brackets on each side of said tray provided with ribs, guide-plates on said support having ways in which said ribs are slidably arranged, and means connected with said brackets and said guide-plates for producing a close contact between said flexible strips of the tray and the drying-surface of said drum, substantially as and for the purposes set forth.

4. In an apparatus for the desiccation of eggs, or other material, the combination, with a drying-drum, means for actuating the same, and a support, of a coating-tray arranged on said support, consisting, essentially, of a bottom and three inclosing sides, and open toward the drying-surface of said drum, flexible contact-strips connected with the open edges of said tray, brackets on each side of said tray provided with ribs, guide-plates on said support having ways in which said ribs are slidably arranged, and means connected with said brackets and said guide-plates for producing a close contact between said flexible strips of the tray and the drying-surface of said drum, consisting, essentially, of screw-rods having one end attached to a part of the guide-plates and extending through perforated lugs on said brackets at the sides of the tray, and an adjusting-nut on each rod, and a spring encircling each rod, substantially as and for the purposes set forth.

5. In an apparatus for the desiccation of eggs, or other material, the combination, with a drying-drum, and means for actuating the same, of a support, guides on said support, having an upwardly-extending post on each guide, a coating-tray slidably arranged between said guides, and means connected with said posts on said guides and with the tray for causing a close contact between the tray and the drying-surface of the drum, substantially as and for the purposes set forth.

6. In an apparatus for the desiccation of eggs, or other material, the combination, with a drying-drum, and means for actuating the same, of a support, guides on said support, having an upwardly-extending post on each guide, a coating-tray slidably arranged between said guides, and means connected with said posts on said guides and with the tray for causing a close contact between the tray and the drying-surface of the drum, consisting, of a rod secured on each post of said guides, a perforated lug on each side of the tray, through which said rod is passed, an adjusting-nut on each rod, and a spring encircling each rod between the said nuts and the lugs on the tray, substantially as and for the purposes set forth.

7. In an apparatus for the desiccation of eggs, or other material, the combination, with a drying-drum, and means for actuating the same, of a support, guides on said support, having an upwardly-extending post on each guide, a coating-tray, brackets attached to the sides of said tray, a rib on each bracket slidably arranged in a way of each guide, a lug on each plate or bracket, and means connected with said posts of the guides and with said lugs of said brackets, for causing a close contact between the tray and the drying-surface of the drum, substantially as and for the purposes set forth.

8. In an apparatus for the desiccation of eggs, or other material, the combination, with a drying-drum, and means for actuating the same, of a support, guides on said support, having an upwardly-extending post on each guide, a coating-tray, brackets attached to the sides of said tray, a rib on each bracket slidably arranged in a way of each guide, a perforated lug on each plate or bracket, and means connected with said posts of the guides and said perforated lugs of said brackets, for causing a close contact between the tray and the drying-surface of the drum, consisting, essentially, of a rod secured on each post of said guides, said rods extending through said perforated lugs on said brackets, an adjusting-nut on each rod, and a spring encircling each rod on that portion between said adjusting-nuts and the said lugs, substantially as and for the purposes set forth.

In testimony that I claim the invention set forth above I have hereunto set my hand this 22d day of January, 1901.

PERCY B. TAYLOR.

Witnesses:
FREDK. C. FRAENTZEL,
GEO. D. RICHARDS.